US012520099B2

(12) United States Patent
Kaku

(10) Patent No.: US 12,520,099 B2
(45) Date of Patent: Jan. 6, 2026

(54) INFORMATION PROCESSING APPARATUS AND METHOD

(71) Applicant: TOYOTA JIDOSHA KABUSHIKI KAISHA, Aichi-ken (JP)

(72) Inventor: Wataru Kaku, Musashino (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 133 days.

(21) Appl. No.: 18/631,051

(22) Filed: Apr. 10, 2024

(65) Prior Publication Data

US 2024/0349008 A1 Oct. 17, 2024

(30) Foreign Application Priority Data

Apr. 11, 2023 (JP) ................................ 2023-064455

(51) Int. Cl.
*H04S 7/00* (2006.01)

(52) U.S. Cl.
CPC .................................... *H04S 7/307* (2013.01)

(58) Field of Classification Search
CPC ........................................................ H04S 7/307
USPC .............. 381/98, 62, 61, 310, 300; 333/165; 455/255
See application file for complete search history.

(56) References Cited

U.S. PATENT DOCUMENTS

2023/0396919 A1* 12/2023 Ayhan .................... H04R 3/005
2024/0022854 A1 1/2024 Usami et al.

FOREIGN PATENT DOCUMENTS

| | | | |
|---|---|---|---|
| JP | 5967418 | B2 | 8/2016 |
| JP | 2020-031303 | A | 2/2020 |
| WO | 2022/220102 | A1 | 10/2022 |

* cited by examiner

*Primary Examiner* — Thjuan K Addy
(74) *Attorney, Agent, or Firm* — HAUPTMAN HAM, LLP

(57) ABSTRACT

An information processing apparatus includes a controller, and the controller is configured to adjust a sound pressure level and a timing of reaching an observation point with respect to a first component that reaches, within a virtual three-dimensional space, the observation point from a sound source in a shortest distance based on a representative frequency band of the sound source and material of an obstacle through which the first component passes, adjust a sound pressure level and a timing of reaching the observation point with respect to a second component other than the first component based on the representative frequency band of the sound source, generate synthetic sound by combining, at a ratio in accordance with an attribute of the sound source and an attribute of the obstacle, the first component and the second component with respect to which respective adjustments are made, and simulate the generated synthetic sound.

5 Claims, 5 Drawing Sheets

VS

VS

INFORMATION PROCESSING APPARATUS AND METHOD

CROSS-REFERENCE TO RELATED APPLICATION

This application claims priority to Japanese Patent Application No. 2023-064455 filed on Apr. 11, 2023, the entire contents of which are incorporated herein by reference.

TECHNICAL FIELD

The present disclosure relates to an information processing apparatus and a method.

BACKGROUND

Technology related to sound generation in a virtual space is known. For example, Patent Literature (PTL) 1 discloses a sound generating apparatus having a sound processing means that hierarchically connects signal processing means capable of processing sound data, and an output destination determination means that determines an output destination of a sound source means based on the positional relationship between a sound source and a virtual sound receiving point. PTL 1 then discloses a technique for processing sound data using a first adjustment means that adjusts the volume of the sound data based on a parameter to determine the change in sound that passes through an object and linearly reaches the sound receiving point from the sound source, and a second adjustment means that adjusts the volume of the sound data based on a parameter to determine the change in sound that diffracts around the object and reaches the sound receiving point from the sound source.

CITATION LIST

Patent Literature

PTL 1: JP 2020-031303 A

SUMMARY

In sound field simulation that reproduces a sound field, especially a wide outdoor sound field, within a virtual three-dimensional space, the amount of calculation is enormous because volume and the like are calculated based on direct sound and diffracted sound with respect to the sound data from the sound source. However, the reduction in the amount of calculation is insufficient and there is room for improvement with respect to technology related to sound field simulation.

It would be helpful to improve technology related to sound field simulation.

An information processing apparatus according to an embodiment of the present disclosure is an information processing apparatus including a controller configured to:

- adjust a sound pressure level and a timing of reaching an observation point with respect to a first component that reaches, within a virtual three-dimensional space, the observation point from a sound source in a shortest distance based on a representative frequency band of the sound source and material of an obstacle through which the first component passes;
- adjust a sound pressure level and a timing of reaching the observation point with respect to a second component other than the first component based on the representative frequency band of the sound source;
- generate synthetic sound by combining, at a ratio in accordance with an attribute of the sound source and an attribute of the obstacle, the first component and the second component with respect to which respective adjustments are made; and
- simulate the generated synthetic sound as being sound that reaches the observation point by propagating from the sound source within the virtual three-dimensional space.

A method according to an embodiment of the present disclosure is a method performed by an information processing apparatus, the method including:

- adjusting a sound pressure level and a timing of reaching an observation point with respect to a first component that reaches, within a virtual three-dimensional space, the observation point from a sound source in a shortest distance based on a representative frequency band of the sound source and material of an obstacle through which the first component passes;
- adjusting a sound pressure level and a timing of reaching the observation point with respect to a second component other than the first component based on the representative frequency band of the sound source; and
- generating synthetic sound by combining, at a ratio in accordance with an attribute of the sound source and an attribute of the obstacle, the first component and the second component with respect to which respective adjustments are made, wherein
- the generated synthetic sound is simulated as being sound that reaches the observation point by propagating from the sound source within the virtual three-dimensional space.

According to an embodiment of the present disclosure, technology related to sound field simulation is improved.

DETAILED DESCRIPTION

Hereinafter, an embodiment of the present disclosure will be described.

Outline of Embodiment

Figure 1:
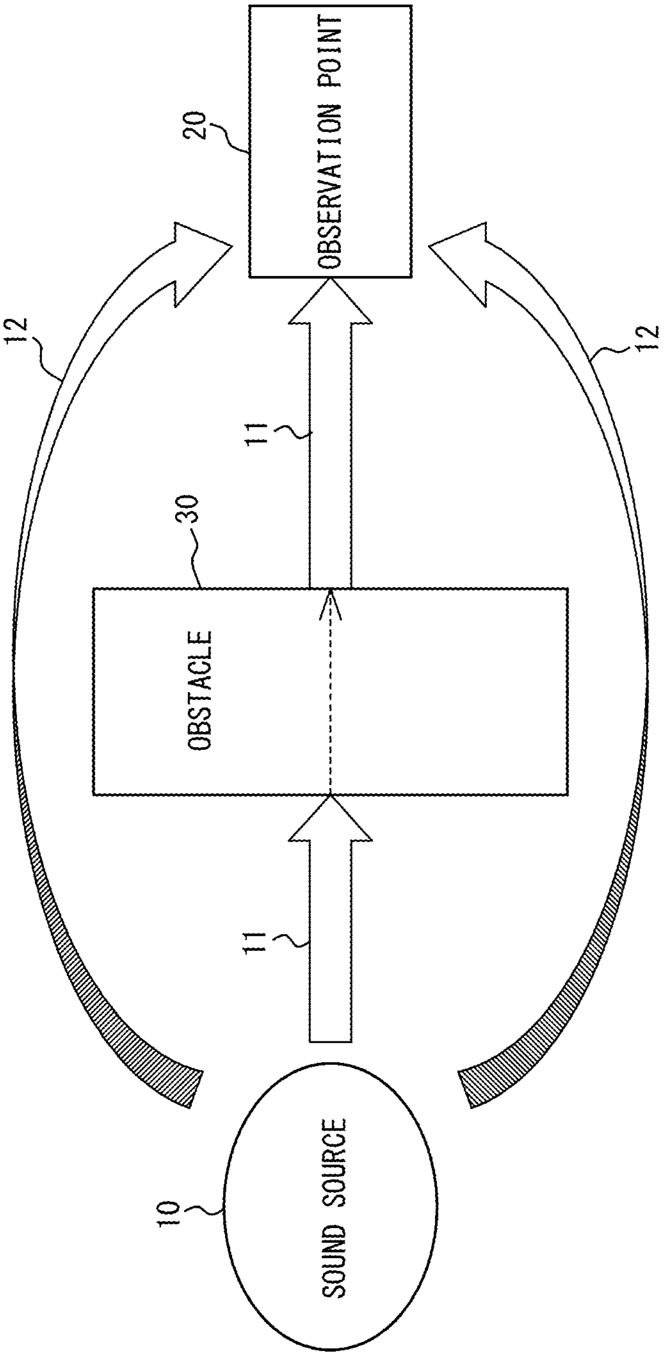
FIG. 1 is a conceptual diagram of a simulation in a virtual three-dimensional space.

With reference to FIG. 1, an outline of a simulation by an information processing apparatus according to an embodiment of the present disclosure will be described. FIG. 1 is a conceptual diagram of the simulation in the virtual three-dimensional space VS. In the virtual three-dimensional space VS created in the information processing apparatus, there are a sound source 10, an observation point 20, and an obstacle 30 between them. The virtual three-dimensional space VS is composed corresponding to the real sound field.

The sound from the sound source 10 reaches the observation point 20 by means of a first component (Direct Path component, sometimes called "direct sound") 11 that passes through the obstacle 30 from the sound source 10 and reaches the observation point 20 in the shortest distance, and a second component (Reflection Path component, sometimes called "echo sound") 12 that is a component other than the first component. The second component is diffracted sound that bypasses the obstacle 30 and reaches the observation point 20. The second component may include echoes from the sound source 10 that reflect off surrounding structures and reach the observation point 20.

Although a real sound source 10 emits a unique tone wave containing various frequency components, in the simulation according to the present embodiment, the sound source 10 is assumed to emit only frequency components in the representative frequency band at a unique sound pressure level. As described below, the frequency at which the peak sound pressure level appears in the sound emitted by the real sound source 10 and the frequency region in its vicinity are identified as the representative frequency band of the sound source 10 in question. Instead of the representative frequency band, the frequency of the peak sound pressure level may be used as the representative frequency, and the sound source 10 may be simulated as emitting sound at the representative frequency. Since sound has different acoustic characteristics, such as attenuation rate, depending on the frequency, simulations based on the acoustic characteristics of representative frequency bands (or representative frequencies) can sufficiently reproduce realistic sound transmission with a small amount of calculation. In addition, individual sounds (sound sources) have sound pressure level as one of the attributes of sound, because sound transmission is affected by sound pressure level.

The observation point 20 is the point where the sound propagating from the sound source 10 is observed. In the simulation according to the present embodiment, the synthetic sound of the first component (direct sound) 11 and the second component (echo) 12 reaching the observation point 20 at the respective timings of reaching from the sound source 10 is simulated as the sound heard by a human at that point.

The obstacle 30 is placed in the middle of the path that reaches the observation point 20 from the sound source 10 in the shortest distance. Although the obstacles 30 in reality are diverse, in the simulation according to the present embodiment, the obstacles 30 are classified into multiple obstacle groups. In the simulation, the obstacle material is set for each obstacle group, and the attenuation characteristics and propagation velocity of the sound as it passes through each material. Such a setup makes it possible to reproduce realistic sound transmission with a small amount of computation. Furthermore, each individual obstacle 30 has its size (size) as one of its attributes.

First, an outline of the present embodiment will be described, and details thereof will be described later. For the simulation, the representative frequency band of the sound source 10 and the material of the obstacle 30 are identified. The information processing apparatus (controller) adjusts the sound pressure level at the observation point 20 and the timing of reaching the observation point 20 with respect to the first component (direct sound) that passes through the obstacle 30 from the sound source 10 and reaches the observation point 20 in the shortest distance, based on the representative frequency band of the sound source 10 and the material of the obstacle 30. With respect to the second component (echo) other than the first component, the sound pressure level at the observation point 20 and the timing of reaching the observation point 20 are adjusted based on the representative frequency band of the sound source 10. The information processing apparatus (controller) then generates synthetic sound by combining the volume-adjusted first and second components at a ratio in accordance with the attributes of the sound source 10 (e.g., sound pressure level) and the obstacle 30 (e.g., size of the obstacle 30). The generated synthetic sound simulates the sound reaching the observation point 20, i.e., the sound observed at the observation point 20.

Thus, according to the present embodiment, the simulation of the sound field is performed by limiting the sound emitted by the sound source 10 to a representative frequency band. The sound from the sound source 10 is divided into a first component (direct sound) 11 that passes through the obstacle 30 and a second component (echo) other than the first component, which is adjusted based on the representative frequency of the sound source 10 and the characteristics of the material of the obstacle 30. Furthermore, the synthetic sound is generated by combining the first and second components at a ratio in accordance with the attributes of the sound source 10 and the obstacle 30. Thus, for example, when reproducing an actual outdoor sound field within a virtual three-dimensional space, the amount of calculation can be reduced for the sound emitted by the sound source 10 hidden by the obstacle 30. Therefore, the technology related to sound field simulation is improved in that it is easier to control the increase in the amount of calculation while ensuring the reproducibility of the sound field.

Next, the information processing apparatus 50 that performs the simulation will be described in detail.

<Information Processing Apparatus Configuration>

Figure 2:
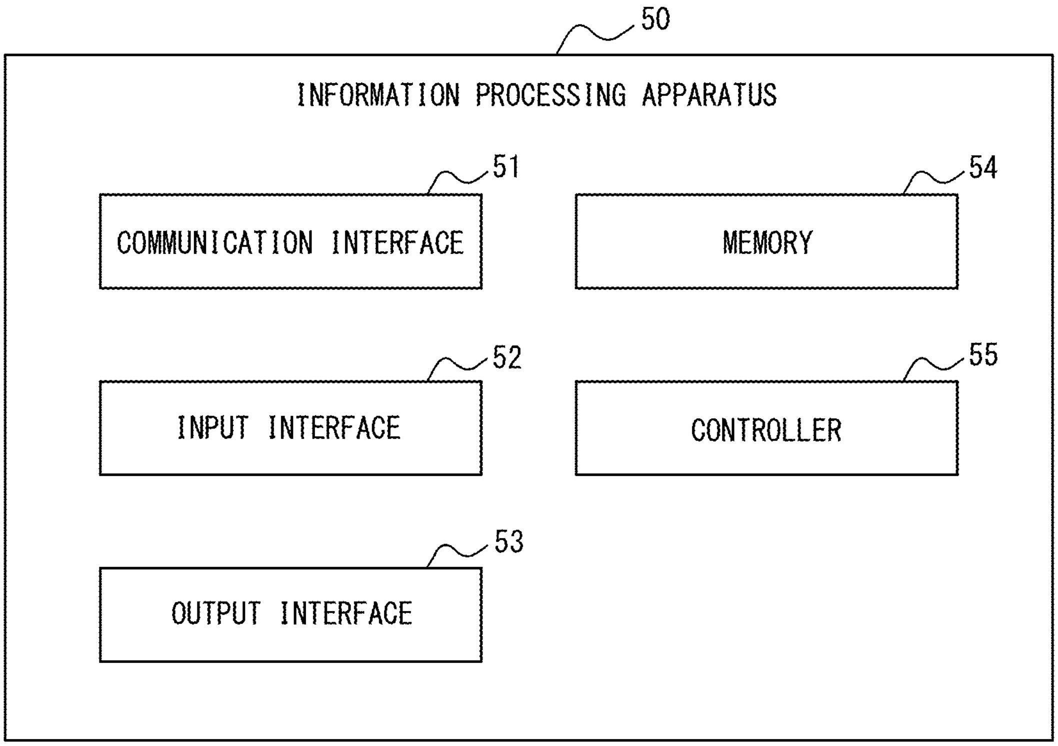
FIG. 2 is a block diagram illustrating a schematic configuration of an information processing apparatus.

The information processing apparatus 50 is, for example, a computer such as a server apparatus. As illustrated in FIG. 2, the information processing apparatus 50 includes a communication interface 51, an input interface 52, an output interface 53, a memory 54, and a controller 55.

The communication interface 51 includes at least one interface for communication for connecting to the network or the like. The communication interface is compliant with mobile communication standards such as the 4th generation (4G) standard or the 5th generation (5G) standard, a wired local area network (LAN) standard, or a wireless LAN standard, for example, but not limited to these, and may be compliant with any communication standard. In the present embodiment, the information processing apparatus 50 can communicate with other apparatuses via the communication interface 51. The information processing apparatus 50 may exchange the setting conditions and simulation results of the virtual three-dimensional space according to the present embodiment via the communication interface 51.

The input interface 52 includes at least one interface for input. The interface for input is, for example, a physical key, a capacitive key, a pointing device, or a touch screen integrally provided with a display. The input interface 52 accepts an operation for inputting data to be used for the operations of the information processing apparatus 50. The input interface 52 may be connected to the information processing apparatus 50 as an external input device, instead of being included in the information processing apparatus 50. As an interface for connection, for example, an interface compliant with a standard such as Universal Serial Bus (USB), High-Definition Multimedia Interface (HDMI®) (HDMI is a registered trademark in Japan, other countries, or both), or Bluetooth® (Bluetooth is a registered trademark in Japan, other countries, or both) can be used.

The output interface 53 may include at least one output device for outputting information to notify the user of the information. The output device is a speaker for outputting information as audio, a display for outputting information as images or video, or the like, for example, but is not limited to these. The output interface 53 may include an interface for connecting to an external output device.

The memory 54 includes one or more memories. The memories included in the memory 54 may each function as, for example, a main memory, an auxiliary memory, or a cache memory. The memory 54 stores any information to be used for operations of the information processing apparatus 50. For example, the memory 54 may store a system program, an application program, a database, and the like. In the present embodiment, an acoustic database in which various data to be used for simulation are accumulated is stored in the memory 54. The information stored in the memory 54 may be updated with, for example, information acquired via the communication interface 51.

The controller 55 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit may be, for example, an Application Specific Integrated Circuit (ASIC). The controller 55 controls the operations of the entire information processing apparatus 50.

The functions of the information processing apparatus 50 are realized by execution of a program according to the present embodiment by a processor serving as the controller 55. That is, the functions of the information processing apparatus 50 are realized by software. The program causes a computer to execute the operations of the information processing apparatus 50, thereby causing the computer to function as the information processing apparatus 50. That is, the computer functions as the information processing apparatus 50 in accordance with the program.

The program can be stored on a non-transitory computer readable medium. The non-transitory computer readable medium is, for example, flash memory, a magnetic recording device, an optical disc, a magneto-optical recording medium, or ROM. In addition, the program is distributed, for example, by selling, transferring, or lending a portable medium such as a Secure Digital (SD) card, a digital versatile disc (DVD), or a compact disc read only memory (CD-ROM) in which the program is stored.

This section describes the acoustic database stored in the memory 54 of the information processing apparatus 50. Various data are stored in the acoustic database regarding the acoustic characteristics of each frequency band (or frequency), the materials of the obstacles 30 classified into multiple obstacle groups, and the sound transmission characteristics of each material.

The acoustic characteristics for each frequency band (or frequency) stored in the acoustic database are, for example, the attenuation and diffraction characteristics in space for each frequency band. As sound propagates through the air, the sound pressure gradually weakens. Sound attenuation depends on air temperature, humidity, and frequency, etc. In the present embodiment, changes in attenuation characteristics with frequency are reflected in the simulation. In general, high-frequency sounds have shorter wavelengths and are more easily attenuated, while low-frequency sounds have longer wavelengths and are less easily attenuated. Thus, the attenuation characteristics (distance attenuation) in space for each frequency band (or frequency) are obtained and stored in the acoustic database. In addition, in general, sound waves are more direct and diffracted less loudly at higher frequencies with shorter wavelengths. On the other hand, in the low frequency range, where wavelengths are longer, sound waves tend to wrap around obstacles, resulting in high diffraction volume. Thus, the percentage of diffracted sound per frequency band (or frequency) is determined and stored in the acoustic database. Since sound pressure level also affects various acoustic characteristics, the relationship between sound pressure level and acoustic characteristics is also stored in the database. In the present embodiment, sound pressure level is treated as one of the attributes of sound.

In the acoustic database, the obstacles 30 are classified into multiple obstacle groups. The classification categories of the obstacles 30 can be set arbitrarily, but in the present embodiment, it is preferable to use a coarse classification setting without too much detail from the viewpoint of reducing the calculation volume. For example, the obstacles 30 are classified into groups such as "automobiles," "two-wheeled vehicles (motorcycles)," "man-made objects (buildings, etc.)," "natural objects (trees, etc.)," etc. The obstacle 30 (or group of obstacles) is characterized by its material. The materials comprising each obstacle group may be set, for example, for the "automobile" group, the material may be set along with its area ratio, such as "80% metal+20% glass". From the viewpoint of calculation volume reduction, it is preferable to set the material to be representative of the typical material for each obstacle group (the material that occupies the majority of the area, or the material that constitutes the portion where the sound travels the shortest distance from the sound source 10 to the observation point 20 and mainly passes through). For each material, the attenuation characteristics (attenuation rate or transmission rate) and the speed of sound propagation are set when sound passes through the material. Since the sound attenuation characteristics and propagation velocity of each material depend on the frequency of sound, it is desirable to set the sound attenuation characteristics and propagation velocity for each frequency range (or frequency). Even the same automobile may be classified as a unique classification group different from automobile, since vehicle whose body is largely composed of glass (e.g., e-Palette (registered trademark), etc.) have different sound attenuation characteristics from those of ordinary automobile. The finer the classification category of the obstacles 30, the more desirable it is from the standpoint of sound reproducibility, but the finer the subdivision, the greater the computational complexity tends to be. Therefore, the classification category of the obstacles 30 can be determined as appropriate, taking into account the balance between sound reproducibility and calculation volume.

As described above, with respect to the obstacles 30, the acoustic database first accumulates a correspondence table of multiple obstacle groups and the types of obstacles 30 classified into each obstacle group. For each obstacle group, a representative material comprising the obstacles 30 is then established. Each material that makes up the obstacle 30 has attenuation characteristics and sound propagation velocity when sound passes through it for each frequency domain (or frequency), and is stored in the acoustic database.

In the present embodiment, the size (size) of the obstacles 30 is treated as one of the attributes of the individual obstacles 30. Depending on the size of the obstacle 30, the amount of the first component (direct sound) and the second component (echo) reaching or the ratio at the observation point 20 will differ. Therefore, the relationship between the size of the obstacle 30 and the ratio of the first and second components from the sound source 10 to the observation point 20 is also stored in the acoustic database.

The acoustic and diffraction characteristics for each frequency band and the sound propagation characteristics of the obstacles 30 may be obtained theoretically or experimentally. For example, by placing the sound source 10 and the obstacle 30 at predetermined locations in a real space, and placing the acoustic measurement device at the location of the observation point 20, an environment in which acoustic characteristics are actually measured is configured. In this actual measurement environment, when sound in a specific frequency range is output from the sound source 10 at a set sound pressure level, the sound at the observation point 20 at this time is measured by the acoustic measurement device. By varying the frequency and the sound pressure level of the sound output from the sound source 10 in various ways, the sound at the observation point under each condition is measured. Data on changes in the frequency and the sound pressure level of the sound are then acquired from the contrast between the output sound of the sound source 10 and the measured sound at the observation point 20. Similarly, by varying the type and size of the obstacle group for the obstacle 30 in various ways, the sound at the observation point 20 under each condition is measured, and data about the obstacle 30 is acquired from the measurement results. In particular, by making the material of the obstacle 30 a material through which sound does not penetrate, i.e., a material in which the first component, which reaches the observation point in the shortest distance from the sound source, is zero, only the second component of the sound is acquired. Experiments with the obstacles 30 of such material can be used to separate the first and second components at the observation point. Furthermore, by combining and comparing experiments in which the sound waves from the 10 sound sources are varied with experiments in which the type of obstacle group is varied, various coefficients for acoustic characteristics can be obtained experimentally.

In this way, various coefficients are created and stored in the acoustic database for the acoustic and diffraction characteristics of each frequency band and the sound propagation characteristics of the obstacles 30. The controller 55 can acquire the coefficients used to simulate the sound field by searching the acoustic database using the representative frequency band of the sound source 10, the sound pressure level, the obstacle group, etc. as queries when performing the operations described in FIG. 3 below.

<Flow of Operations of Information Processing Apparatus>

Figure 3:
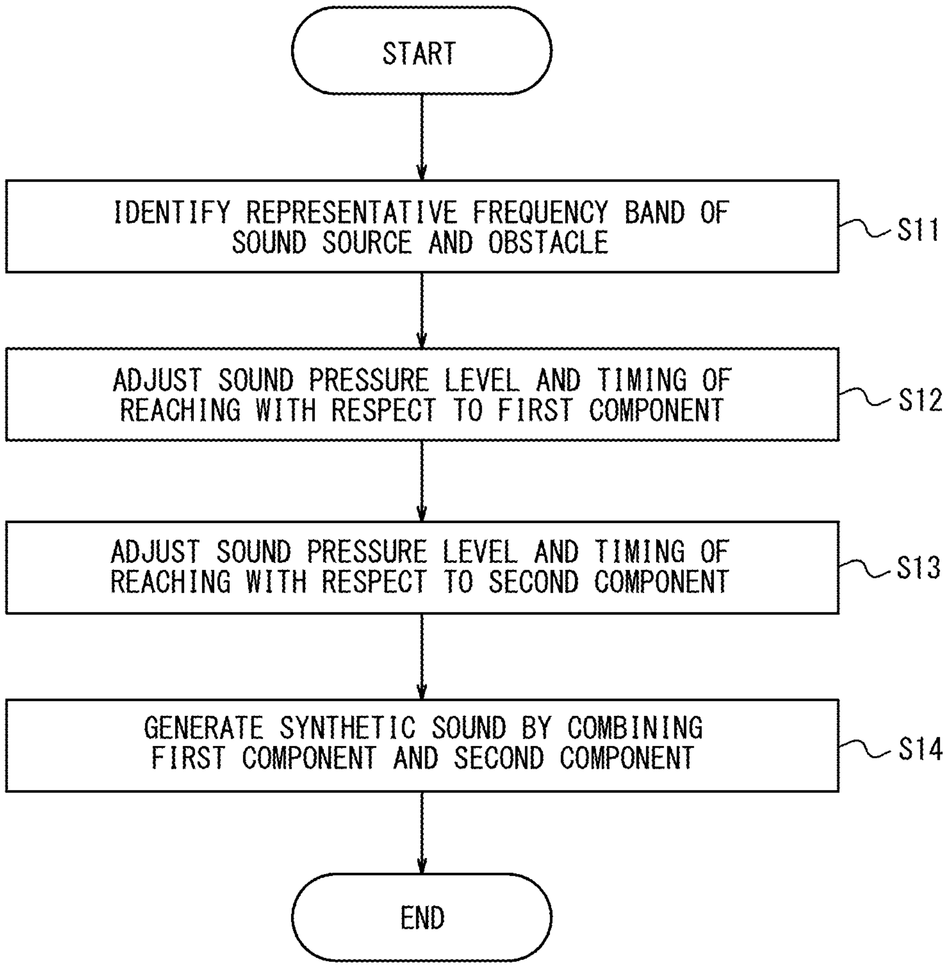
FIG. 3 is a flowchart illustrating operations of the information processing apparatus.

Operations of the information processing apparatus 50 according to the present embodiment will be described with reference to FIG. 3. The operations in FIG. 3 correspond to a method according to the present embodiment. The method according to the present embodiment is a simulation of how sound from the sound source 10 is heard (observed) at the observation point 20, especially when the sound source 10 is blocked by the obstacle 30 (obstruction or occlusion state).

Step S11: The controller 55 of the information processing apparatus 50 identifies the representative frequency band of the output sound for the sound source 10 in the virtual three-dimensional space VS corresponding to the sound field. It also identifies the obstacles 30 through which the first component of sound (sound waves) passes.

Figure 4:
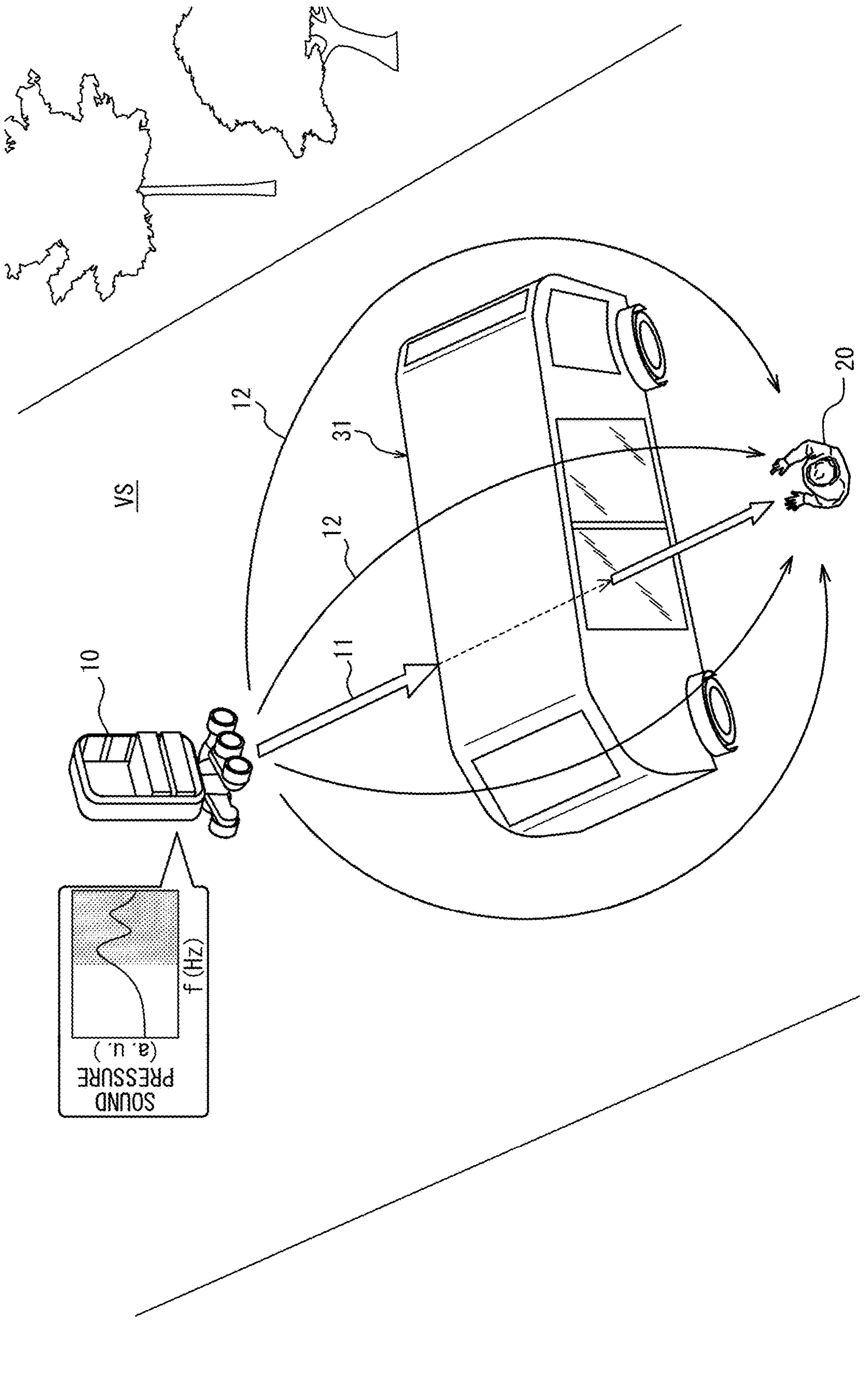
FIG. 4 is a diagram illustrating a specific example of the virtual three-dimensional space.

Specifically, first, the controller 55 creates a virtual three-dimensional space VS corresponding to the sound field. Any method can be employed to create the virtual three-dimensional space VS. For example, the controller 55 acquires the setting conditions of the sound field (virtual three-dimensional space VS) and information on each target object required for the simulation via the communication interface 51 or the input interface 52. In the present embodiment, the positional information for the sound source 10 in the sound field (i.e., the information indicating the position of the sound emission), the positional information for the observation point 20, and the positional information for the obstacle 30 are acquired. For the sound source 10, sound source data (e.g., data indicating the sound pressure level at each frequency) of the sound produced by the sound source 10 may be acquired, and for the obstacle 30, information such as the specific type, structure, and size (size) of the object may also be acquired. In the present embodiment, there is one sound source 10 and one obstacle 30, respectively, but there may be other sound sources or other objects (arrangements in the sound field) in the virtual three-dimensional space VS. For example, the controller 55 may create a virtual three-dimensional space VS as shown in FIG. 4. In FIG. 4, a sound-generating automated transfer robot is positioned as the sound source 10, and a person is positioned at the observation point 20.

Next, the controller 55 identifies the representative frequency bands of the sound sources 10 based on the acquired sound source data for the sound sources 10 to be simulated. Any method can be employed to identify the representative frequency band. For example, the controller 55 refers to the sound pressure level for each frequency indicated in the sound source data. The controller 55 may then identify a predetermined range of frequencies centered on the frequency at which the peak sound pressure level appears as the representative frequency band of the sound source 10 in question. FIG. 4 shows a graph with sound pressure on the vertical axis and frequency on the horizontal axis as the sound source data for the sound source 10 (automatic transfer robot). The controller 55 refers to the sound pressure level at each frequency indicated by the sound source data and identifies the frequency at which the peak of the sound pressure level appears as the representative frequency. The controller 55 may then set a frequency region of a predetermined width (hatched range) that includes the representative frequency as the representative frequency band of the sound source 10. Alternatively, the controller 55 may determine the frequencies at which the sound pressure level drops a predetermined percentage (dB) from the peak at the low and high frequency sides of the representative frequency, respectively, and identify the region of frequencies where the sound pressure level is from the peak to the predetermined percentage as the representative frequency band. In this way, the controller 55 identifies the representative frequency band of the sound source 10 according to the sound pressure level indicated by the acquired sound source data.

The controller 55 also acquires information on the obstacles 30 placed between the sound source 10 and the observation point 20, such as the type, structure, and size (size) of the objects comprising the obstacles 30, and identifies the obstacles 30. After identifying the obstacles 30, the controller 55 classifies the identified obstacles 30 into one of the obstacle groups based on the correspondence table of the obstacle groups and the obstacles 30 classified into each group stored in the acoustic database. Next, the controller 55 reads the data of the material of the classified obstacle group from the acoustic database. The data on the material of the obstacle 30 is used as a coefficient parameter in simulating the sound propagating from the sound source 10 in the virtual three-dimensional space and reaching the observation point 20 in the shortest distance.

Step S12: The controller 55 adjusts the sound pressure level at the observation point 20 and the timing of reaching the observation point 20 with respect to the first component that reaches the observation point 20 from the sound source 10 in the shortest distance based on the representative frequency band of the sound source 10 and the material of the obstacle 30 through which the first component passes. Since the method of the present embodiment simulates the case where the sound source 10 is blocked by the obstacle 30, the first component (direct sound) that reaches the observation point 20 from the sound source 10 in the shortest distance passes through the obstacle 30.

Specifically, based on the representative frequency band of the sound source 10 and the material of the obstacle 30 identified in step S11, the controller 55 reads, from the acoustic database, information on sound attenuation characteristics and propagation speed with respect to the material of the obstacle 30. It is common for the attenuation characteristics of sound in objects to vary with frequency. In the example in FIG. 4, an obstacle 31 is classified as a group of vehicles whose bodies are mostly composed of glass. The direct sound 11, which travels from the sound source 10 to the observation point 20 in the shortest distance, passes through two pieces of glass (glass on both sides of the car body). Therefore, the material of the obstacle 31 is set as two pieces of glass. For the simulation of the first component (direct sound) 11, the attenuation characteristics and propagation velocity of the glass when sound in the representative frequency band of the sound source 10 passes through it are used for the obstacle 31. If the attenuation rate (transmittance) of sound when passing through a single sheet of glass is 0.5, the sound passing through the two sheets of glass in the obstacle 31 will be attenuated to $0.5 \times 0.5 = 0.25$. From the propagation velocity of the glass, the time it takes for the sound to propagate through the glass portion of the obstacle 31 is calculated.

From the respective three-dimensional coordinates in the virtual three-dimensional space VS, the controller 55 calculates the linear distance between the sound source 10 and the observation point 20. Then, based on the velocity of the sound in space (here, in air), the time it takes for the sound to propagate through the space to the observation point 20 (between the sound source 10 and the obstacle 31, the space inside the obstacle 31, and from the obstacle 31 to the observation point 20) is calculated. Based on the attenuation characteristics in the space of the representative frequency band of the sound source 10, the attenuation of the sound pressure level as it propagates through the space to the observation point 20 is calculated. Although the attenuation was calculated here based on the representative frequency band of the sound source 10 to reduce the computational load, the controller 55 may calculate the distance attenuation of sound in the air more accurately based on predetermined conditions, including environmental conditions of the sound field (temperature distribution, humidity, wind direction, etc.).

The propagation time of the direct sound 11 from the sound source 10 to the observation point 20 is then calculated by adding the propagation time in space (in air) and the propagation time at the obstacle 31. By adding the attenuation in the space and the attenuation at the obstacle 31 (two pieces of glass), the attenuation of the sound pressure level of the direct sound 11 from the sound source 10 to the observation point 20 is calculated. Since the propagation time and sound pressure level change compared to when there are no obstacles 31, the process of determining these corresponds to adjusting the sound pressure level at the observation point 20 and the timing of reaching the observation point 20.

Thus, the controller 55 adjusts the sound pressure level at the observation point and the timing of reaching the observation point with respect to the first component, which reaches the observation point 20 in the shortest distance from the sound source 10, based on the representative frequency band of the sound source 10 and the material of the obstacle 30 through which the first component passes.

Step S13: The controller 55 adjusts the sound pressure level at the observation point 20 and the timing of reaching the observation point 20 with respect to the second component (echo) other than the first component (direct sound) from the sound source 10, based on the representative frequency band of the sound source 10. Since the method of the present embodiment simulates the case where the sound source 10 is blocked by the obstacle 30, the second component (echo) is the sound that propagates bypassing the obstacle 30.

Specifically, based on the information on the representative frequency band of the sound source 10 identified in step S11, the controller 55 reads, from the acoustic database, data on the propagation speed, attenuation characteristics, degree of diffraction, and the like of the sound in the representative frequency band in space. The controller 55 also finds a representative propagation path that bypasses the obstacle 30 based on structural data about the obstacle 30. For example, in the example in FIG. 4, the path from the sound source 10 to the observation point 20 by transmitting through space includes a path that bypasses the front of the vehicle 31 to reach the observation point 20, a path that bypasses the rear of the vehicle 31 to reach the observation point 20, and a path that bypasses the top of the vehicle 31 to reach the observation point 20. Of these, the path with the shortest path distance is set as the representative propagation path. The calculation of the distance for each route may be approximated by a straight line connecting the sound source 10, the end of the vehicle 31, and the end of the vehicle 31 and the observation point 20, respectively. In this case, the diffracted volume can also be calculated based on the angle formed by the line connecting the sound source 10 and the edge of the vehicle 31 and the line connecting the edge of the vehicle 31 and the observation point 20.

Based on the velocity of sound in space (in this case, in air), the time it takes to propagate along a representative propagation path from the sound source 10 to the observation point 20 is calculated. The sound pressure level at the observation point 20 is calculated based on the attenuation characteristics of the representative frequency band of the sound source 10 as it propagates along the representative propagation path and the degree of diffraction in the representative frequency band. Since the propagation time and sound pressure level change compared to when there are no obstacles 31, the process of determining these corresponds to adjusting the sound pressure level at the observation point 20 and the timing of reaching the observation point 20. Adjusting the sound pressure level and the timing of reaching based on the representative propagation paths can reduce the amount of calculation. The second component may be obtained as diffracted sound reaching the observation point 20 by multiple paths, reflecting the diffraction phenomenon as accurately as possible; therefore, the method of obtaining the second component may be determined as appropriate, considering the balance between sound reproducibility and calculation volume.

Thus, the controller 55 adjusts the sound pressure level at the observation point 20 and the timing of reaching the observation point 20 for the second component (echo) other than the first component arriving at the observation point 20 from the sound source 10, based on the representative frequency band of the sound source 10.

Step S14: The controller 55 combines the first component adjusted in step S12 and the second component adjusted in step S13 at a ratio in accordance with the attributes of the sound source 10 and the obstacle 30 to generate a synthetic sound, and simulates the generated synthetic sound as being sound that reaches the observation point 20 by propagating from the sound source 10 within the virtual three-dimensional space VS.

Here, the attribute of the sound source 10 is the sound pressure level of the sound source 10, and the attribute of the obstacle 30 is the size (size) of the obstacle 30. For example, the higher the sound pressure level of the sound source 10, the higher the ratio of the second component (echo) is set. Conversely, the lower the sound pressure level of the sound source 10, the smaller the echo is muffled by the environmental noise, so the ratio of the first component (direct sound) is set higher.

The smaller the size of the obstacle 30, the higher the ratio of the overall sound reaching the observation point 20 from the sound source 10 to the generated sound. The ratio of the second component (echo), which can go around the obstacle 30 and reach the observation point 20, is set higher than the first component (direct sound). Conversely, the larger the size of the obstacle 30, the more sound hits the obstacle 30 and fails to reach the observation point 20, so the ratio of the total sound reaching the observation point 20 from the sound source 10 to the generated sound is lower. The ratio of the second component (echo), which can go around the obstacle 30 and reach the observation point 20, is set lower than the first component (direct sound). The respective ratios may be calculated in advance or obtained experimentally.

The controller 55 combines the first component adjusted in step S12 and the second component adjusted in step S13 based on these ratios to generate the synthetic sound. This synthetic sound is the sound measured at the observation point 20. As described above, the information processing apparatus 50 (controller 55) can simulate the sound propagating from the sound source 10 within the virtual three-dimensional space VS and reaching the observation point 20.

For the sake of explanation, step S13 is described as if it were executed after step S12, but steps S12 and S13 may be executed in reverse order or simultaneously. The process ends after step S14.

Figure 5:
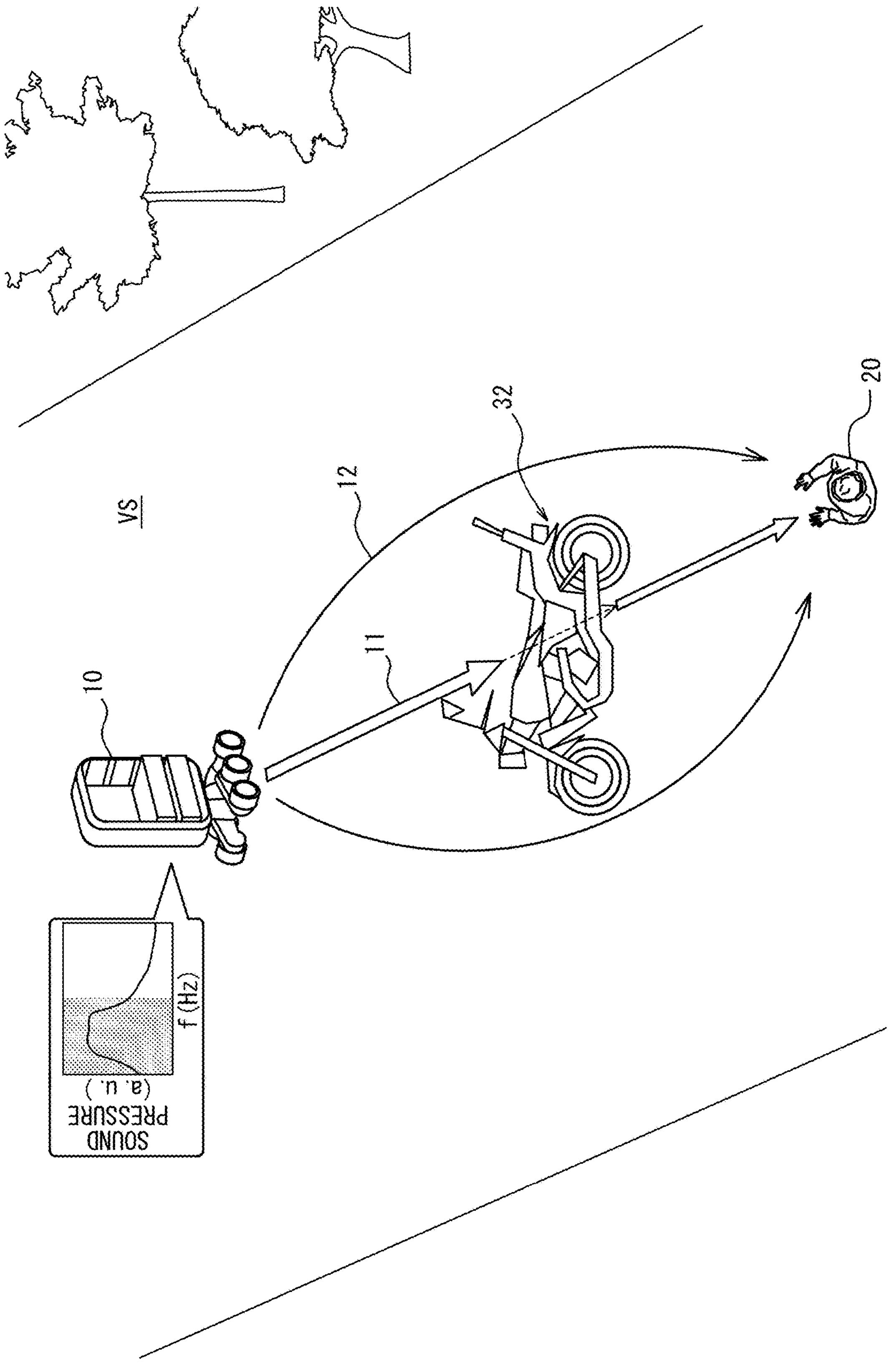
FIG. 5 is a diagram illustrating another specific example of the virtual three-dimensional space.

Next, we will explain the operation of the information processing apparatus 50 using FIG. 5, another concrete example of a virtual three-dimensional space, as an example. The parts that overlap with FIG. 4 will be simplified in the explanation.

Step S11: The controller 55 of the information processing apparatus 50 configures a virtual three-dimensional space VS corresponding to the sound field. In FIG. 5, an automatic transfer robot is placed as the sound source 10, a two-wheeled vehicle 32 is placed as an obstacle, and a person is placed at the location of observation point 20.

Next, the controller 55 identifies the representative frequency bands of the sound waves to be output for the sound source 10 within the virtual three-dimensional space VS. In the present embodiment, the sound source data for the sound source 10 (automatic transfer robot) has a peak sound pressure level on the relatively low frequency side, as shown in FIG. 5. The controller 55 can identify the frequency at which the sound pressure peaks as the representative frequency and set the frequency region of a predetermined width that includes the representative frequency (the hatched range on the low frequency side) as the representative frequency band of the sound source 10. The boundary of the frequency band may be set, for example, as a frequency that is a predetermined decibel (dB) below the maximum sound pressure level.

An obstacle 32 is classified, for example, in the group of "two-wheeled vehicles (motorcycles)". In the path of the direct sound 11 that travels from the sound source 10 to the observation point 20 in the shortest distance, there are metal parts that make up the majority of the two-wheeled vehicle's body. Therefore, the material of the obstacle 32 is set to be metal.

Step S12: The controller 55 adjusts the sound pressure level at the observation point 20 of the first component (direct sound) and the timing of reaching the observation point 20 based on the representative frequency band of the sound source 10 and the material of the obstacle 32. In the present embodiment, the attenuation characteristics and propagation velocity of the metal for the representative frequency band of the sound sources 10 are used in the simulation. The sound pressure level at the observation point 20 of the first component (direct sound) 11 may be assumed to be almost zero, since practically no metal allows sound to pass through it.

Step S13: The controller 55 adjusts the sound pressure level at the observation point 20 of the second component (echo) and the timing of reaching the observation point 20 based on the representative frequency band of the sound source 10. Specifically, the controller 55 acquires, from the acoustic database, data on the propagation speed, attenuation characteristics, degree of diffraction, and the like of the sound in the representative frequency band in space. The controller 55 also finds a representative propagation path that bypasses the obstacle 32 based on structural data about the obstacle 32. In the example in FIG. 5, the path with the shortest distance from the sound source 10 to the observation point 20, bypassing the two-wheeled vehicle 32, is set as the representative propagation path. The time it takes for the sound to propagate along the representative propagation path from the sound source 10 to the observation point 20 is then calculated based on the velocity of the sound in space (in this case, in air). Based on the attenuation characteristics in space of the representative frequency band of the sound source 10 and the degree of diffraction, the attenuation of the sound pressure level as it propagates along the representative propagation path to the observation point 20 is calculated. In this way, the sound pressure level at the observation point 20 and the timing of reaching the observation point 20 are adjusted for the second component (echo).

Step S14: The controller 55 combines the first component adjusted in step S12 and the second component adjusted in step S13 at a ratio in accordance with the attributes (sound pressure level) of the sound source 10 and the attributes (size) of the obstacle 30 to generate synthetic sound. In the example in FIG. 5, the size of the obstacle 30 is relatively small, so the ratio of the total sound reaching the observation point 20 from the sound source 10 is high, and the ratio of the second component (echo) is set higher than the first component (direct sound). In the implementation shown in FIG. 5, the first component (direct sound) is almost zero, so the sound measured at observation point 20 is effectively only the second component (echo). Thus, the sound propagating from the sound source 10 within the virtual three-dimensional space VS and reaching the observation point 20 is simulated.

In this way, the controller 55 uses the representative frequency band of the sound source 10 to simulate the sound propagating from the sound source 10 within the virtual three-dimensional space VS to reach one observation point 20. The controller 55 also groups obstacles and typifies the materials of the obstacles for simulation. This allows the sound field simulation to be performed with a limited frequency range for sound sources and simplified materials for obstacles. As a result, a sound field simulation that balances the reduction of calculation volume and the reproducibility of the sound field is achieved.

Although the present embodiment is a simulation of a case where the sound source 10 is blocked by an obstacle 30, the information processing apparatus and method of the present disclosure may be used to evaluate the height of distinguishability for the sound of the sound source 10 when blocked by the obstacle 30. The distinguishability refers to the ease of understanding the fact that a certain sound (mainly artificial sound) is reproduced in a sound field, and the intent of the reproduction of that artificial sound. For example, in the present embodiment, various sounds (sampled sounds) generated at various sound pressure levels with the sound source 10 shielded by the obstacle 30 are simulated at the observation point 20. For each sound simulated as reaching the observation point 20, the user (participant in the experiment) is asked to evaluate whether he or she can recognize the presence of the sound source 10, or whether he or she can identify the sound heard as belonging to the sound source 10. Any method can be employed to evaluate distinguishability for sound. For example, the sound source 10 may output various sounds (sampled sounds) with sounds other than the sound source 10 (noise) present in the sound field. The user scores the distinguishability for each sample sound at the observation point. The aggregate results of the scores may be stored in the memory 54 of the information processing apparatus 50 as an evaluation result of the height of distinguishability for each sample sound. The controller 55 may extract the sample sound with the highest total score as the sample of the highest distinguishability, for example, based on the aggregate results stored in the memory 54.

In this way, it is possible to simulate what sound the robot should produce in the actual sound field, depending on the material, size, location, etc. of the obstacles 30 present, to determine the appropriate sound for the robot to emit in order to identify them to people.

As described above, the information processing apparatus 50 according to the present embodiment adjusts the sound pressure level and the timing of reaching the observation point with respect to the first component that reaches the observation point 20 from the sound source 10 within the virtual three-dimensional space VS in the shortest distance, based on the representative frequency band of the sound source 10 and the material of the obstacle 30 that the first component passes through, and adjusts the sound pressure level and the timing of reaching the observation point with respect to the second component other than the first component based on the representative frequency band of the sound source 10. The information processing apparatus 50 then generates synthetic sound by combining, at a ratio in accordance with an attribute of the sound source 10 and an attribute of the obstacle 30, the first component and the second component with respect to which respective adjustments are made, and simulates the generated synthetic sound as being sound that reaches the observation point 20 by propagating from the sound source 10 within the virtual three-dimensional space.

According to such a configuration, the simulation of the sound field is performed by limiting the sound emitted by the sound source 10 to the representative frequency band. Thus, for example, when reproducing an outdoor sound field within a virtual three-dimensional space, the amount of calculation for the sound emitted by the sound source 10, which is hidden by the obstacles 30, is reduced. Therefore, it is possible to obtain simulation results that are close to the reality of the acoustics of the sound field, while reducing the amount of computation.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

The invention claimed is:

1. An information processing apparatus comprising a controller configured to:

adjust a sound pressure level and a timing of reaching an observation point with respect to a first component that reaches, within a virtual three-dimensional space, the observation point from a sound source in a shortest distance based on a representative frequency band of the sound source and material of an obstacle through which the first component passes;

adjust a sound pressure level and a timing of reaching the observation point with respect to a second component other than the first component based on the representative frequency band of the sound source;

generate synthetic sound by combining, at a ratio in accordance with an attribute of the sound source and an attribute of the obstacle, the first component and the second component with respect to which respective adjustments are made; and simulate the generated synthetic sound as being sound that reaches the observation point by propagating from the sound source within the virtual three-dimensional space.

2. The information processing apparatus according to claim 1, wherein the attribute of the sound source is a sound pressure level of the sound source and the attribute of the obstacle is a size of the obstacle.

3. The information processing apparatus according to claim 2, wherein an adjustment of the sound pressure level and the timing of reaching the observation point with respect to the second component is made based on a representative propagation path of the second component.

4. The information processing apparatus according to claim 1, wherein the controller is configured to simulate the sound that reaches the observation point, by outputting a variety of sample sounds from the sound source, and the information processing apparatus further comprises a memory configured to store an evaluation result of height of distinguishability for each sample sound at the observation point.

5. A method performed by an information processing apparatus, the method comprising:

adjusting a sound pressure level and a timing of reaching an observation point with respect to a first component that reaches, within a virtual three-dimensional space, the observation point from a sound source in a shortest distance based on a representative frequency band of the sound source and material of an obstacle through which the first component passes;

adjusting a sound pressure level and a timing of reaching the observation point with respect to a second component other than the first component based on the representative frequency band of the sound source; and generating synthetic sound by combining, at a ratio in accordance with an attribute of the sound source and an attribute of the obstacle, the first component and the second component with respect to which respective adjustments are made, wherein the generated synthetic sound is simulated as being sound that reaches the observation point by propagating from the sound source within the virtual three-dimensional space.

* * * * *